United States Patent [19]

Merritt, III

[11] Patent Number: 4,790,125
[45] Date of Patent: Dec. 13, 1988

[54] FEED ROLLERS FOR ROUND BALER NET DISPENSER

[75] Inventor: John H. Merritt, III, New Holland, Pa.

[73] Assignee: New Holland Inc., New Holland, Pa.

[21] Appl. No.: 45,946

[22] Filed: May 1, 1987

[51] Int. Cl.⁴ .............................................. B65B 11/04
[52] U.S. Cl. ....................................... 53/587; 53/118;
    53/389; 226/176; 226/183; 226/180
[58] Field of Search ................. 53/118, 211, 389, 587;
    226/180, 183, 190, 176

[56] References Cited

U.S. PATENT DOCUMENTS

| | | | |
|---|---|---|---|
| 1,427,602 | 8/1922 | Kaiser | 226/183 X |
| 2,523,387 | 9/1950 | Natzke | 226/173 Z |
| 2,637,561 | 5/1953 | Connell | 226/183 X |
| 3,669,331 | 6/1972 | Renold | 226/183 X |
| 3,766,726 | 10/1973 | Carroll | 226/176 X |
| 3,806,018 | 4/1974 | Gebler | 226/183 |
| 3,985,277 | 10/1976 | Wright | 226/183 X |

FOREIGN PATENT DOCUMENTS

| | | | |
|---|---|---|---|
| 77272 | 6/1919 | Austria | 226/183 |
| 2153294 | 8/1985 | United Kingdom | 53/118 |

*Primary Examiner*—John Sipos
*Attorney, Agent, or Firm*—Larry W. Miller; Frank A. Seemar; Darrell F. Marquette

[57] ABSTRACT

A net dispensing mechanism for a round baler is disclosed wherein a pair of pinch rollers are cooperable with a driven feed roller to feed netting material from a source of supply into the bale forming mechanism of the round baler so that the finished round bale can be wrapped with an external layer of netting before being ejected from the baler. The pinch rollers are mounted on opposing sides of the feed roller and are adjustable relative thereto to permit proper engagement of both pinch rollers with the feed roller to allow proper feeding of net therebetween. An overcenter linkage is connected to the mechanism mounting the pinch rollers to affect a movement of the pinch rollers between engaged and disengaged positions for selectively permitting the threading of net between the pinch rollers and the feed roll. One embodiment has both pinch rollers mounted on a pivot arm which is pivitally mounted on an eccentric to permit an adjustment of the position of the pinch rollers relative to the feed roller. Another embodiment utilizes a sliding plate fixedly mounting one pinch roller and pivotally mounting a second pinch roller via a pivot arm to permit a clamping of the pinch rollers against the feed roller.

3 Claims, 5 Drawing Sheets

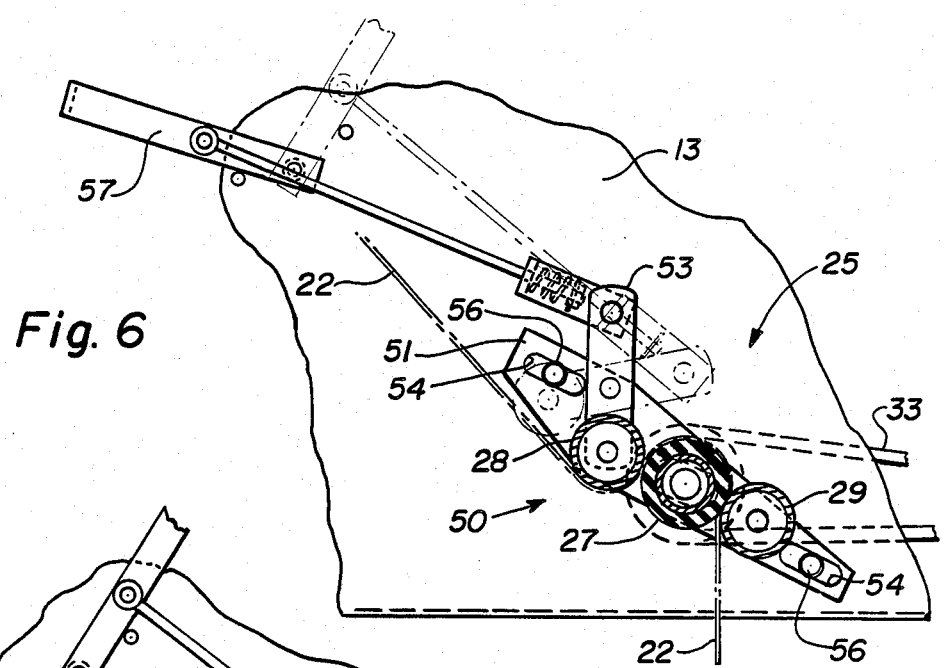
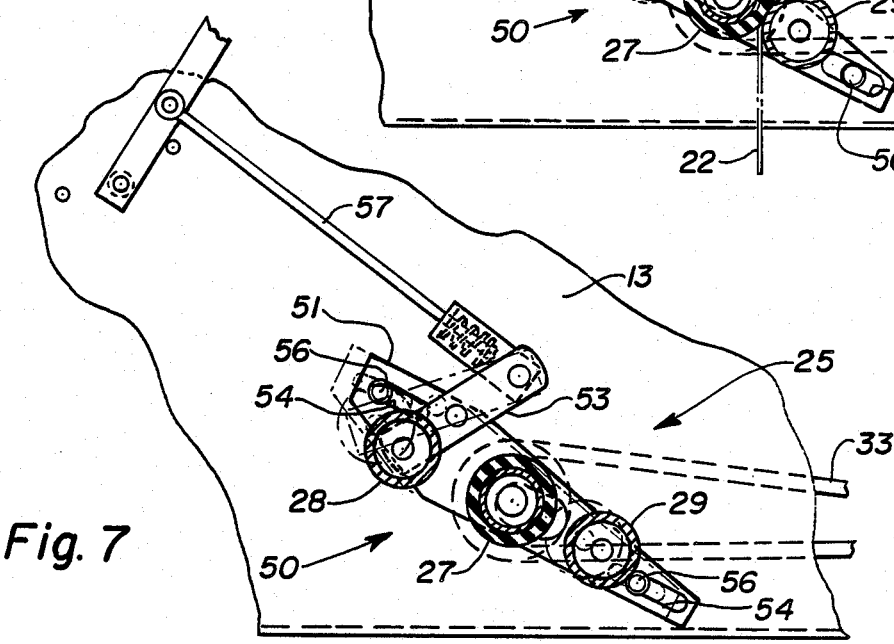
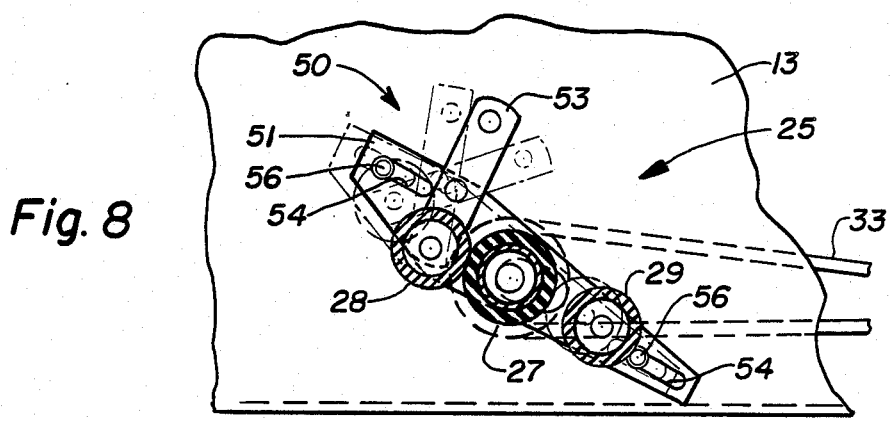

FEED ROLLERS FOR ROUND BALER NET DISPENSER

BACKGROUND OF THE INVENTION

The present invention relates generally to round balers utilized for making a cylindrical bale of crop material and, more particularly, to a net dispensing device for selectively introducing netting material into the round baler's bale forming mechanism so that the finished bale can be wrapped with an outer layer of netting.

Net dispensing mechanisms for use in conjunction with round balers to wrap the exterior of a finished round bale with a layer of netting material is a relatively recent feature being incorporated into round balers. One such net dispensing device can be found on the Claas Model Rollant 44 round baler which utilizes a tray to physically hold a roll of netting material, the netting material being fed between a driven resilient feed roller and a rigid pinch roller by which means the netting can be fed into the bale chamber of the round baler for wrapping around a completed round bale therewithin. A more detailed description of this net dispensing device can be found with reference to the detailed description of FIG. 9 (prior art) below.

It has been found that the combination of a driven feed roller and one pinch roller does not provide satisfactory feeding of the netting material into the bale forming mechanism. The utilization of more than one pinch roller raises additional problems of positional adjustment between the pinch rollers and the driven feed roller. When the netting material is to be loaded into the net dispensing mechanism, it is necessary to disengage the pinch roller from the feed roller so that the netting material can be threaded therebetween. A reengagement of the pinch roller with the feed roller to pinch the netting material therebetween is necessary for a proper feeding of the netting material into the bale forming mechanism. This problem of reengagement of the pinch roller with the feed roller is more significant with a feed mechanism utilizing more than one pinch roller because all pinch rollers need to be in engagement with the feed roller to properly feed the netting material therebetween.

SUMMARY OF THE INVENTION

It is object of this invention to overcome the aforementioned disadvantages of the prior art by providing a feeding mechanism for a net dispensing apparatus utilizing two pinch rollers engageable with a driven feed roller.

It is another object of this invention to provide a means for assuring the engagement of both pinch rollers with the feed roller when the pinch rollers are moved into the engaged position.

It is an advantage of this invention that a more positive feeding of the netting material into the bale forming mechanism of the round baler is attained.

It is a feature of this invention that a pair of pinch rollers can be journaled on a pivot arm pivotally mounted on the side sheet by an eccentric to permit adjustment of the position of the pinch rollers relative to the feed roller.

It is another feature of this invention that both pinch rollers can be moved between engaged and disengaged positions by the actuation of an overcenter linkage.

It is another advantage of this invention that both pinch rollers can be selectively disengaged from the feed roller to permit the introduction of netting material therebetween.

It is still another advantage of this invention that the positional adjustment of the pinch rollers relative to the feed roller can be conveniently and easily accomplished.

It is still another object of this invention to provide a feed mechanism for a net dispensing apparatus which is durable in construction, inexpensive of manufacture, carefree of maintenance, facile in assemblage, and simple and effective in use.

These and other objects, features and advantages are accomplished according to the instant invention by providing a net dispensing mechanism for a round baler wherein a pair of pinch rollers are cooperable with a driven feed roller to feed netting material from a source of supply into the bale forming mechanism of the round baler so that the finished round bale can be wrapped with an external layer of netting before being ejected from the baler. The pinch rollers are mounted on opposing sides of the feed roller and are adjustable relative thereto to permit proper engagement of both pinch rollers with the feed roller to allow proper feeding of net therebetween. An overcenter linkage is connected to the mechanism mounting the pinch rollers to affect a movement of the pinch rollers between engaged and disengaged positions for selectively permitting the threading of net between the pinch rollers and the feed roll. One embodiment has both pinch rollers mounted on a pivot arm which is pivotally mounted on an eccentric to permit an adjustment of the position of the pinch rollers relative to the feed roller. Another embodiment utilizes a sliding plate fixedly mounting one pinch roller and pivotally mounting a second pinch roller via a pivot arm to permit a clamping of the pinch rollers against the feed roller.

BRIEF DESCRIPTION OF THE DRAWINGS

The advantages of this invention will become apparent upon consideration of the following detailed disclosure of this invention, especially when taken in conjunction with the accompanying drawings wherein:

FIG. 6 is a partial cross-sectional view similar to that of FIG. 3, but showing an alternative embodiment of the pinch roll mounting apparatus, the movement of the overcenter linkage and the pivot arm being shown in phantom;

FIG. 7 is a view similar to that of FIG. 6 with the pinch rollers being disengaged from the resilient feed roller, the movement of the plate and pinch rollers being shown in phantom;

FIG. 8 is a view similar to that of FIG. 7 but showing the movement of the pivotally mounted pinch roller into engagement with the feed roller, the subsequent movement of the plate and other pinch roller into engagement with the feed roller being shown in phantom.

DETAILED DESCRIPTION OF THE PREFERRED EMBODIMENT

Figure 9:
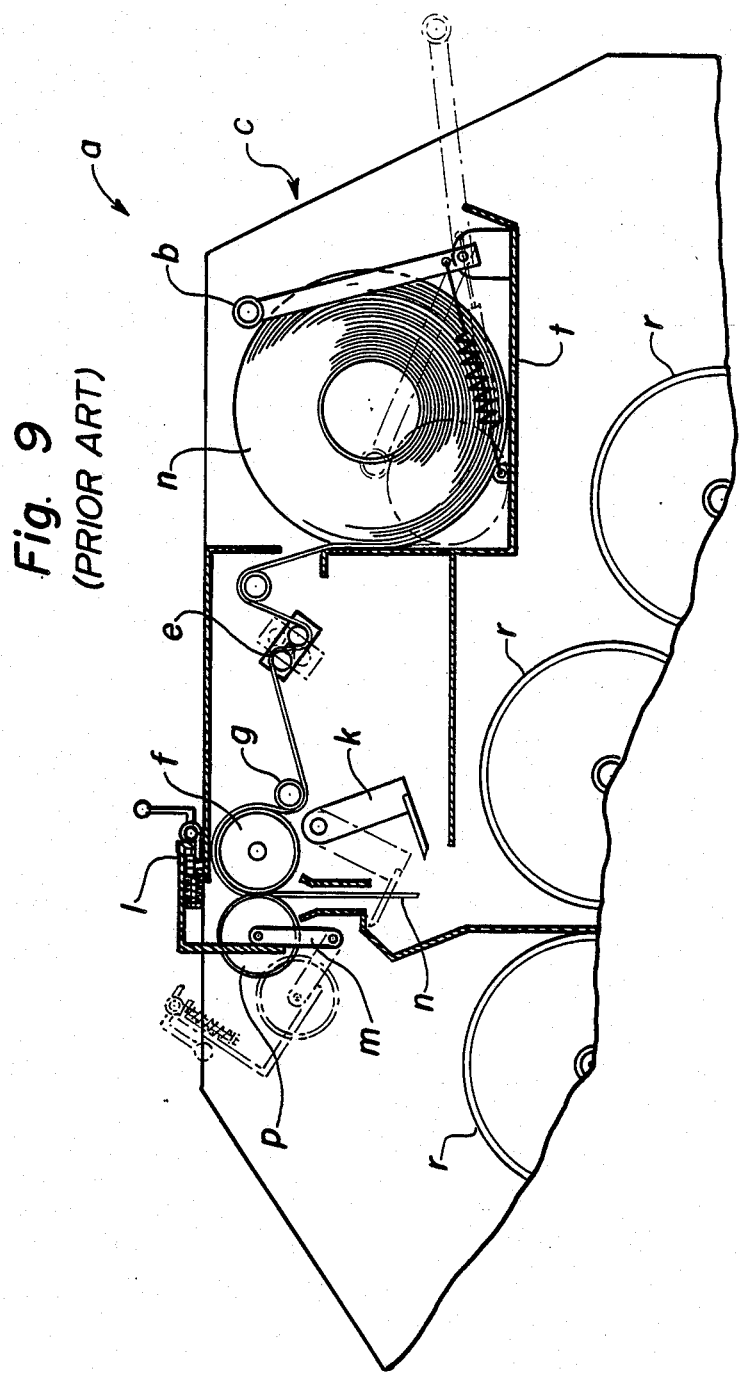
FIG. 9 is a schematic partial side elevational view of the net dispensing apparatus utilized on the Claas Model Rollant 44 round baler which is prior art to the instant invention.

Referring first to FIG. 9, the Claas prior art net dispensing apparatus referred to above will be described in greater detail. The round baler (a) is of the fixed chamber type with a plurality of rollers journalled between opposing side sheets to form a chamber therebetween in which the cylindrical bale is formed. The net dispensing apparatus (c) includes a tray (t) in which a roll of netting material (n) is disposed. A braking bar (b) held into position by an overcenter spring retains the roll of netting material (n) in position in the tray (t) as shown in phantom. The netting material is threaded through a pivotable braking apparatus (e), under a guide roller (g), around the feed roller (f), and between a pinch roller (e) and the feed roller (f). A swinging knife (k) is movable to engage the net between the feed roller (f) and the cylindrical bale to sever the net when a sufficient net has been wrapped around the bale. The pinch roller (p) is mounted on a pivoted arm (m) equipped with a latching mechanism (1) to fixedly secure the pinch roller (p) against and into engagement with the feed roller (f).

Figure 1:
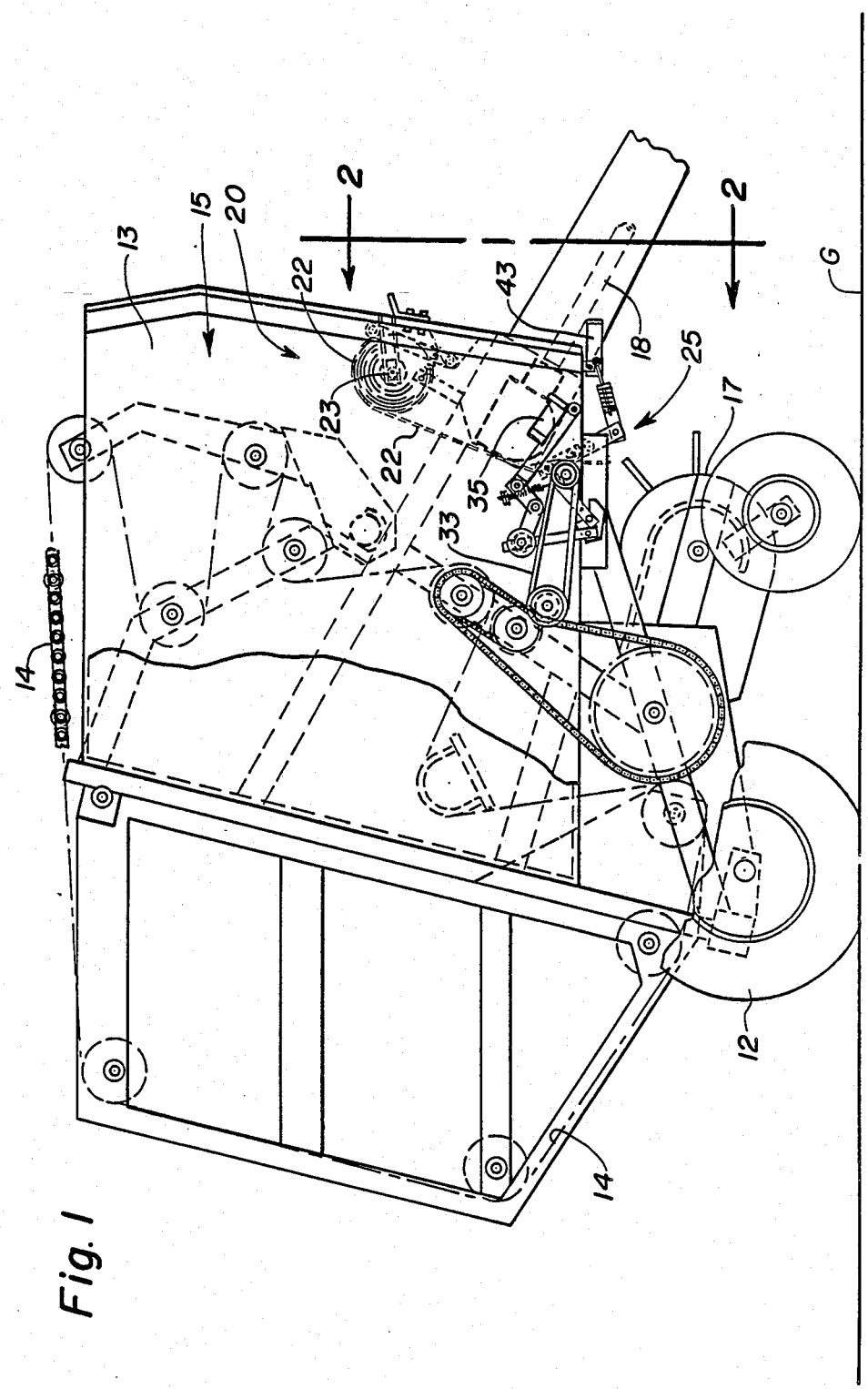
FIG. 1 is a side elevational view of a round baler incorporating the principles of the instant invention, portions of the round baler being broken away to better show the invention.
Figure 2:
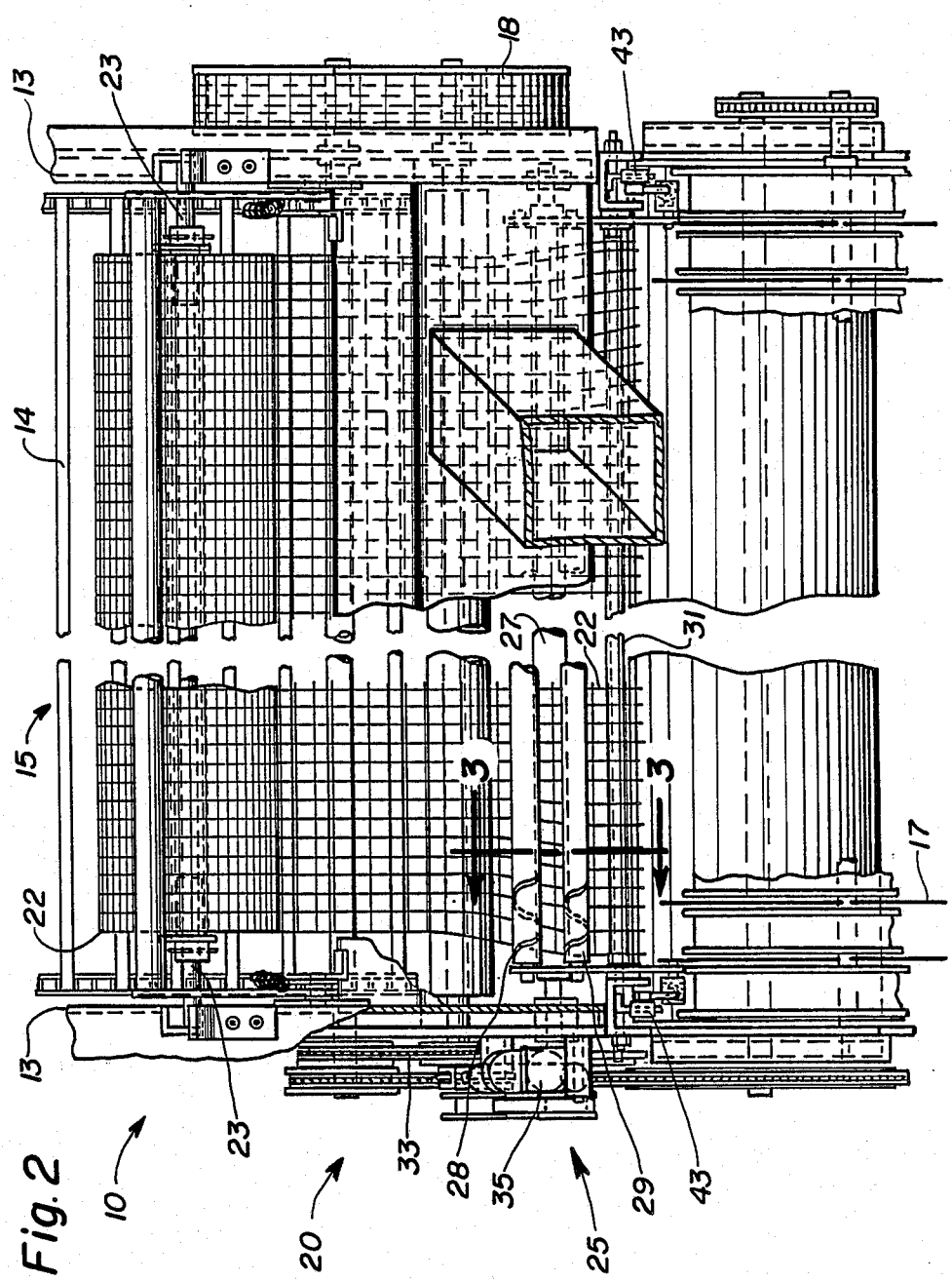
FIG. 2 is a partial front elevational view of the round baler corresponding to lines 2—2 of FIG. 1, portions of the central part of the round baler being broken away for purposes of clarity.

Referring now to the drawings and, particularly, to FIGS. 1 and 2, side and front elevational views of a round baler incorporating the principles of the instant invention can be seen. Any left and right references are used as a matter of convenience and are determined by standing at the rear of the machine facing the forward end, the direction of travel. The round baler 10 is provided with a wheeled frame 12 and is adapted for movement over the ground G. The frame 12 supports a pair of generally vertical, transversely spaced apart side sheets 13 between which a chain and slat apron 14 is rotatably driven to form the bale forming mechanism 15 within which the cylindrical bale of crop material is formed. A pickup 17 positioned adjacent the ground G delivers crop material from the ground G into the bale forming mechanism 15 in a conventional manner. A drive train 18 provides operational power to all the operable components within the round baler 10. This round baler 10, as described above, is of generally conventional construction and operation and is described in greater detail in a number of U.S. patents, such as U.S. Pat. No. 4,426,833, the descriptive portions of which are incorporated herein by reference.

The round baler 10, however, has been modified to be equipped with a net dispensing apparatus 20. A roll of netting material 22 is mounted on a spindle 23 and rotatably journalled between opposing side sheets 13 at a forward position of the round baler 10. The netting material 22 is threaded downwardly from the roll to a feeding mechanism 25 in the form of a feed roll 27 and first and second pinch rollers 28,29. The net dispensing apparatus 20 also includes a pivoted knife assembly 31 used to sever the netting material 22 after a sufficient amount has been applied to the outer surface of the cylindrical bale, a drive mechanism 33 for operably powering the feed roll 27, and an actuating mechanism 35 for selectively engaging the drive 33 to affect a feeding of the netting material 22 into the bale forming mechanism 15. A more detailed description of the operation of the drive mechanism 33 and the actuating mechanism 35 can be found in co-pending U.S. patent application Ser. No. 045,977, entitled "Net Dispenser Drive for Round Balers", filed concurrently herewith. The descriptive portions of the structure and operation thereof being incorporated herein by reference.

Figure 3:
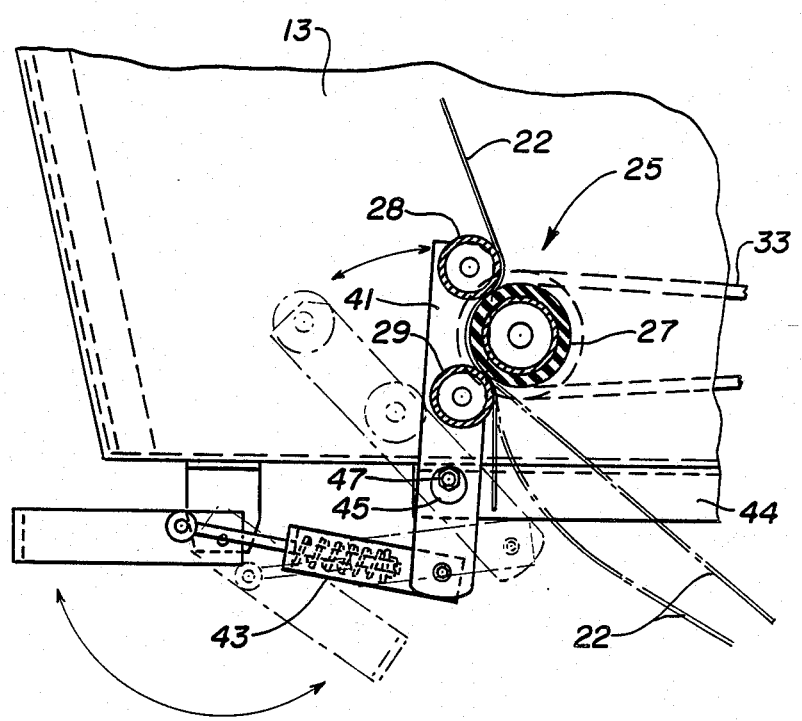
FIG. 3 is an enlarged partial cross-sectional view of the feed roll mechanism forming a part of the net dispensing apparatus corresponding to lines 3—3 of FIG. 2, the movement of the overcenter linkage and the pivot arm mounting the pinch rollers being shown in phantom.
Figure 4:
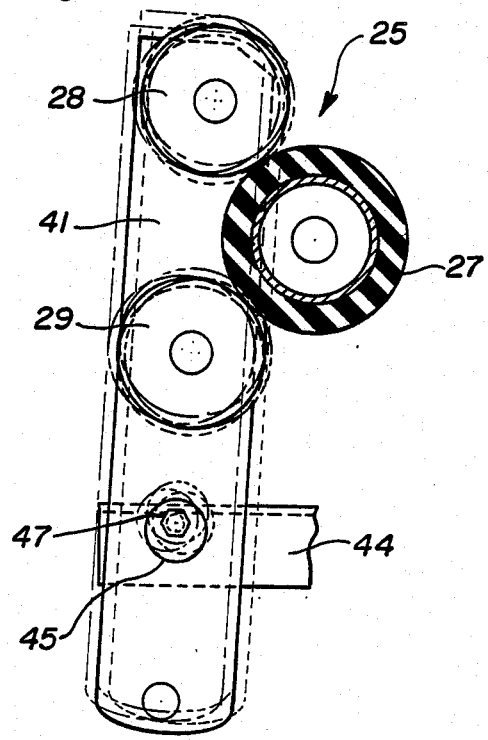
FIG. 4 is an enlarged detail view of the pinch rollers engaged with the resilient feed roller as shown in FIG. 3, the positional movement of the pivot arm corresponding to rotation of the eccentric being shown in broken lines.
Figure 5:
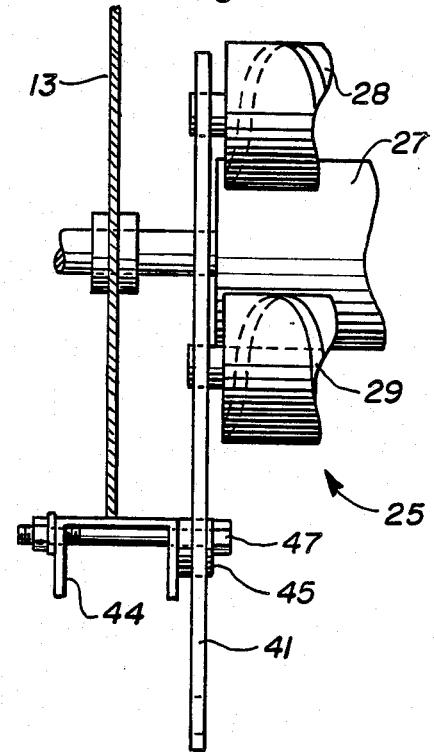
FIG. 5 is an enlarged detail view of the mounting of the pinch rollers and feed roller along the right side sheet as seen from the front of the round baler.

Referring now to FIGS. 3-5, the feeding mechanism 25 can best be seen. The netting material 22 is fed between the first and second pinch rollers 28,29 and the feed roller 27. As shown in phantom in FIG. 3, when the feed roller 27 is operably driven, the netting material 22 is fed rearwardly with the incoming crop material from the pickup 17 into the bale forming mechanism 15 where it will be wrapped around the cylindrical bale until the feed roll is halted and the pivoted knife 31 moved into position to sever the netting material 22. In the embodiment shown in FIGS. 3-5, the pinch rollers 28,29 are mounted on a pivot arm 41 and are movable between an engaged position, shown in solid lines in FIG. 3, and a disengaged position, shown in phantom in FIG. 3. An overcenter linkage 43 is connected to the pivot arm 41 and is engageable by the operator forwardly of the round baler 10 to swing the pivot arm and move the pinch rollers 28,29 between the engaged and disengaged positions.

The pivot arm 41 is pivotally mounted to a sub-frame member 44 by a pivot member 45. The pivot member 45 in turn is pivotally rotatable about an eccentrically positioned bolt 47. As best seen in FIG. 5, the bolt 47 clamps the pivot member 45 against the sub-frame member 44 to fix the selected position of the pivot member 45. As best seen in FIG. 4, the rotation of the pivot member 45 about the eccentric bolt 47 affects a positional movement of the pivot arm 41 and the mounted pinch rollers 28,29 relative to the feed roller 27. In this manner, the position of the pinch rollers 28,29 can be varied so that they are firmly engaged with the resilient feed roller 27. Once the selected position of the pinch rollers 28,29 has been attained, a tightening of the eccentric bolt 47 clamps the pivot member 45 into position so that an actuation by the overcenter linkage 43 will consistently move the pinch roller 28,29 between a proper engaged position and a disengaged position.

Referring to FIGS. 6-8, an alternative embodiment of the pinch roll mounting mechanism can best be seen. The netting material 22 comes downward from the source of supply on the spindle 23 and is threaded between the pinch rollers 28,29 and the resilient feed roller 27 to hang downwardly therefrom for engagement with the incoming crop material at the selected time as described above. In this particular embodiment, the second pinch roller 29 is journalled on a plate 51 on one side of the feed roller 27. The first pinch roller 28 is mounted on a pivot arm 53 which, in turn, is pivotally connected to the plate 51. The plate 51 is provided with slot-shaped holes 54 formed therein. The plate 51 is mounted to the side sheet 13 by pins 56 extending therefrom through the respective slotted holes 54. The overcenter linkage 57 is accessible by the operator forwardly of the round baler 10 and is connected to the pivot arm 53 to affect movement thereof as indicated in phantom in FIG. 6.

As best seen in FIG. 8, actuation of the overcenter linkage 57 to affect pivotal movement of the pivot arm 53 and move the first pinch roller 28 into engagement with the feed roller 27 places the pinch roll mounting mechanism 50 into a position wherein further pivotal movement of the pivot arm 53 will cause the plate 51 to slide along the pins 56 until the second pinch roller 29 is firmly engaged on the opposing side of the feed roller 27. As best seen in FIG. 7, to permit a threading of a fresh supply of netting material 22 through the feed mechanism 25, the overcenter linkage 57 can be actuated to affect a pivotal movement of the pivot arm 53 to move the first pinch roller 28 away from the feed roller 27. Because of the partially vertical orientation of the slotted holes 54 through which the pins 56 are positioned, the plate 51 and mounted second pinch roller 29 should fall away from the feed roller 27 by gravity. If not, the second pinch roller 29 could easily be moved away by hand. After threading the netting material 22 between the pinch rollers 28,29 and the feed roller 27, as shown in FIG. 6, the overcenter linkage 57 can be actuated to draws the pinch rollers 28,29 into their engaged position with respect to the feed roller 27.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention, however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a round baler utilized for making cylindrical bales of crop material and having a wheeled frame adapted for movement over the ground; a pair of transversely spaced apart, generally vertical side sheets supported by said frame; bale forming means movably supported between said side sheets for forming a cylindrical bale of crop material; and a net dispensing means positioned adjacent said bale forming means for selectively dispensing netting material from a source of supply of said netting material into said bale forming means from a source of supply of said netting material into said bale forming means so that a finished cylindrical bale of crop material can be wrapped therearound with said netting material, an improved net dispensing means comprising:

a driven transverse feed roller journalled between said sheets and a pair of movable, transversely extending rotatable pinch rollers engageable with said feed roller along the transverse length thereof, said pinch rollers being movable away from said feed roller to permit the introduction of netting material therebetween, said pinch rollers being movable into engagement with said feed roller to pinch said netting material therebetween and permit a feeding thereof into said bale forming means, one of said pinch rollers being mounted between transversely spaced plates and being positioned on one side of said feed roller, the other said pinch roller being rotatably journaled between a pair of pivot arms which are pivotally connected to the corresponding said plate to permit a movement of said other pinch roller relative to said feed roller and said one pinch roller, said other pinch roller being positioned on the opposing side of said feed roller, each said plate being slidably mounted on the adjacent side sheet, said pivot arm being connected to an overcenter linkage to effect a pivotal movement thereof into a position in which said other pinch roller is engaged with said feed roller so that any subsequent pivotal movement of said pivot arm will effect a sliding movement of said plate to draw said one pinch roller into engagement with said feed roller.

2. The round baler of claim 1 wherein each said plate is mounted on pins connected to the corresponding said side sheet, said pins extending through slots formed in said plate to permit the sliding movement of said plate.

3. The round baler of claim 2 wherein said slots are oriented with a vertical component to permit gravity to urge said one pinch roller away from said feed roller when said overcenter linkage is actuated to pivotally move said pivot arm and effect a disengagement of said other pinch roller from said feed roller.

* * * * *